United States Patent
Leidy et al.

[11] 3,713,837
[45] Jan. 30, 1973

[54] FREEZE-THAW CYCLE FOR JUICY SAUSAGE ANALOG

[75] Inventors: Harold T. Leidy, New City, N.Y.; Charles M. Kerrigan, Wayne, N.J.; Duane C. Byble, Ossining, N.Y.

[73] Assignee: General Foods Corporation, White Plaines, N.Y.

[22] Filed: Aug. 20, 1970

[21] Appl. No.: 65,717

Related U.S. Application Data

[63] Continuation-in-part of Ser. No. 35,267, May 6, 1970.

[52] U.S. Cl. .................................... 99/17, 99/109
[51] Int. Cl. ................................................. A23j 3/00
[58] Field of Search ............... 99/14, 17, 109, 18, 108

[56] References Cited

UNITED STATES PATENTS

| | | | |
|---|---|---|---|
| 3,607,860 | 9/1971 | Yamato | 260/123.5 |
| 2,560,621 | 7/1951 | Wrenshall | 99/14 |
| 2,802,737 | 8/1957 | Anson | 99/14 |
| 3,589,915 | 6/1971 | Lustig | 99/109 |
| 3,320,070 | 5/1967 | Hartman | 99/17 |

*Primary Examiner*—A. Louis Monacell
*Assistant Examiner*—Roger B. Andewelt
*Attorney*—Bruno P. Struzzi, Thomas V. Sullivan and Andrew G. Golian

[57] ABSTRACT

A sausage meat analog is formed utilizing a vegetable protein gel with a rendered animal fat and/or vegetable oil and a preferred additional protein gel source albumen, casein, whey or combinations. Additional juiciness is introduced into the protein gel system by freezing the product with subsequent thawing.

2 Claims, No Drawings

3,713,837

FREEZE-THAW CYCLE FOR JUICY SAUSAGE ANALOG

RELATED APPLICATIONS

The present application is a continuation-in-part of Ser. No. 35,267, filed May 6, 1970.

BACKGROUND OF THE INVENTION

The present invention is in the field of meat substitutes or analogs which are derived from non-meat proteinaceous sources. Much development has been made in recent years in producing proteinaceous products that resemble meat which contain little or none of the animal derived protein.

A suitable substitute for meat protein has been found to be vegetable protein which has been concentrated. Extensive deviations in technique and formation are necessary, dependant on the type of meat to be duplicated.

Numerous patents exist in the field of producing meat substitutes. Boyer, U.S. Pat. No. 2,682,466 produces vegetable protein filaments by coagulating a colloidal protein dispersion which filaments are bound together to resemble meat such as filet mignon, turkey and chicken. Anson and Pader, holders of numerous U.S. patents such as U.S. Pat. Nos. 2,802,737; 2,813,024; 2,813,025; 2,830,902; and 2,833,651 teach formation of a "chewy protein gel" which finds utility in synthetic meat products. Kjelson, U.S. Pat. No. 3,343,963 uses edible protein fibers with a binding material of albumen, gluten and oil seed which is heat set to form the simulated meat product. Hartman, U.S. Pat. No. 3,320,070 forms a bacon-like product comprised of fibers of vegetable protein with a binder including albumen and an edible proteinate.

SUMMARY OF THE INVENTION

As in parent application, Ser. No. 35,267, the invention is directed to the formation of sausage meat analogs that need not contain any source of meat. Sausage meat products of the prior art are made by forming a meat-containing emulsion, shaping to physical size and heat curing to stable form. It is this type of sausage meat product that the analog of the present invention duplicates. More specifically, sausage products are resembled wherein an essential characteristic is a moist, juicy mouth feel when the product is consumed. An example of such product is a frankfurter which has different characteristics when compared to a dry sausage.

In the manufacture of the sausage analog which has moist, juicy qualities, a concentrated proteinaceous component derived from a vegetable source is a required constituent. The proteinaceous vegetable material has the quality that upon heating, gelation of a stable physical form occurs. In addition to the vegetable protein, an additional protein source that also gels upon heating, namely albumen, casein or whey may be utilized. The gel that is formed upon heating is considered permanent, that is, in normal food use, including refrigeration and warming to heating temperature, the formed product will retain its shape.

The present sausage analog may have numerous additives including flavoring ingredients, starches, emulsifiers, coloring materials, gums and other proteinaceous sources such as gelatin to complete and balance the sausage analog. These added ingredients are preferably blended into the vegetable gel system before heat setting to a stable physical form.

In the present invention, a necessary additive has been found to be a fat or oil which aids in preparing the moist juicy analogs. Suitable materials include rendered animal fats, hydrogenated vegetable oil, unhydrogenated vegetable oil, and mixtures thereof. However, it has been found that the moisture content of the product in conjunction with these fats or oils and gel precursors does not provide a product that upon heating closely resembles a hot dog-type product that is highly juicy. It has been found unexpectedly that freezing of the product with thawing prior to consumption produces a substantial increase in juiciness qualities. It has further been unexpectedly discovered that the increase in liquid release increase with the time of storage and the decrease in storage temperature.

DETAILED DESCRIPTION OF THE INVENTION initially, it is necessary to define exactly what is encompassed within the meaning of a sausage analog, since the present invention is directed to a specific area of meat technology. A sausage analog duplicates, as closely as possible, a meat product that requires processing into an emulsion system, shaping and heating to solidify to a stable physical form. A proteinaceous vegetable dispersion in which the protein content has been concentrated together with its additives duplicate in function the meat emulsion system. The gel system formed from the protein dispersion in the sausage analog encompasses and entraps additives that are incorporated therein.

A sausage contrasts directly to a steak-type meat which is considered to be any system with substantial quantities of fibers combined in a single mass with a binding ingredient. A sausage or sausage analog would not resemble natural meat cuts such as steak, pork chops or pot roast meats. Additionally, merely changing the physical characteristics of a natural meat does not produce a sausage-type product. For example, hamburger or ground ham involve essentially only grinding or chopping of the initial meat counterpart and will not resemble sausage product in its defined meaning.

To employ positive language in defining a sausage analog, this food is formulated to resemble meat products that are initially formed into an emulsion. The meat emulsion is heated which results in gelation introducing a degree of rigidity. The meat emulsion is formed by components including water and the emulsion system has flow characteristics so that it may be formed into a desired shape. In most instances, the emulsion is stuffed into a casing, although any container may be utilized. Examples of such sausage products include bologna, olive loaf, frankfurter, etc. In the present invention, it is this type of sausage which is duplicated and similarities in the function of the initial formulations, as well as process steps exist. The present vegetable proteinaceous material is formulated into a gel precursor which is the counterpart of the meat emulsion. Both in the sausage and the sausage analog, the constituents are shaped and heated which results in a stable physical form. Process equipment from the meat industry may be employed directly in the manufacture of the sausage analog.

It is the intent of the sausage analog that the protein gel constituent dominate a significant portion of the product mass with added constituents merely enhancing the formed product. The protein gel constituent is derived from an initial proteinaceous dispersion wherein a significant portion of the gel is from the vegetable proteinaceous material. As employed herein, a proteinaceous dispersion refers to the protein material being present in a liquid carrier preferably water either in solution and/or suspension.

The vegetable proteinaceous material, as defined herein, has the quality that upon heating in a carrier such as water, gelation occurs to a stable physical form, i.e. rigidity is introduced. However, as in typical gel systems, elasticity is present. Ordinarily the protein content based on the proteinaceous vegetable material, which has been concentrated, will be above 30 percent by weight (dry basis). No upper limit on a maximum protein content exists in concentrations of protein above 95 percent are satisfactory and desirable. The source materials are varied including oil seeds with a preferred source, soy, due to its high protein content and inexpensiveness. However, many other types of vegetable material may be employed to yield a material rich in protein including peanuts, cottonseed, peas, etc. The source of vegetable protein should be concentrated and preferably bland and in most instances, as in the case of soy, unwanted flavors and oils should be removed. These protein sources are readily available in commercial form such as isolates, concentrates and flours.

The gel precursor component is critical in the product of the sausage analog. The quality of the analog stands or falls with the gel component, since this component as in its meat counterpart dominates the overall product. Gel components in other meat analog systems have different criticality and do not perform the same function in comparison with the sausage analog.

A source of concentrated vegetable protein has been found adequate as the sole gel component to yield a meat analog that is satisfying in quality. However, superior results have been introduced into the analog when at least one additional non-vegetable source of protein is employed. The sources of protein, albumen, casein and whey, or combinations thereof yield an analog that more closely duplicates the quality and characteristics of sausage meat products as defined herein.

The concentrations of weight of gelable vegetable proteinaceous material to albumen, casein, whey or combinations thereof are important for a superior gel system in a sausage analog. The degree of concentration of the vegetable protein may vary, since the necessary criticality is that upon heating gelation to a stable physical form occurs. Therefore, the desired ratios of vegetable proteinaceous material to the added gel component is set forth on the basis of the protein content of the vegetable material, rather than based on the total weight of the vegetable constituent.

The minimum concentrations of vegetable protein to albumen, casein and whey should be of the order of about 3.4:1, 5:3 and 1:1 respectfully. With combinations of albumen, casein or whey, the minimum concentration of vegetable protein is intended to encompass the weighted total of these gel precursors. The maximum vegetable protein concentration to these added gel components should be of the order of about 40 to 1.

The gel precursors together with added components are formed into a system possessing a degree of homogenity. The gel precursor is formed into the gel by the application of heat. The system formed is a normal gel, that is a solid or semi-solid system of protein in colloidal dimensions in a carrier liquid which is preferably water. When using component proteinaceous combinations for gelatinization, it is a requirement that mixing of these materials take place prior to the heat setting operation. While each component, namely the vegetable protein material and the non-vegetable component of albumen, casein or whey may be heat set alone, the intended gel for the sausage analog would not be obtained. With complete non-uniformity, a product with separate heterogenous phases would be obtained, rather than the improved gel for a high quality sausage analog.

It may be readily seen that a source of protein fibers that are not heat set would not be a suitable physical form for the gel. If only protein fibers such as from a vegetable protein were employed, a steak-type fibrous material would be produced, as opposed to a sausage food. If source protein fibers were employed initially for the homogenous gel, the fibers would be comminuted and could no longer be considered to retain their initial physical identity. While fibers may be employed in the sausage analog, their use would be minimal since excess fibers would change the nature of the analog.

When the gel precursor materials together with suitable additives have been properly mixed, these constituents are shaped into the desired physical form and heat set to form the gel. Elevated temperature such as from about 150°F. to about 350°F. may be employed satisfactorily. For convenience and gelation in a short period of time, it is considered that optimum heat treatment temperatures lie above the boiling point of water. A preferred technique of heat setting to form the gel is by an autoclaving operation which in conjunction with the elevated temperature employs elevated pressure.

In a sausage analog, the physical characteristics of the product may range from a very dry hard sausage to a wet juicy-type sausage. Thus, the water content of the product becomes critical if the overall characteristics of the analog are to duplicate its sausage counterpart. However, the water content alone does not always determine the dryness or juiciness of the analog, but rather other ingredients and the technique of processing aid in determining the product's juiciness.

It has been discovered that the fat and/or oil content of the sausage analog in conjunction with the moisture content aids in increasing the juiciness of the product. This juiciness in the product may be described physically in that water together with flavor ingredients are readily released when the product is bitten and consumed. With conventional rendered animal fats as well as vegetable oils both hydrogenated and unhydrogenated, it has been unexpectedly discovered that additional processing is necessitated if full juiciness of the product is to be realized.

With use of rendered animal fats and/or vegetable oils, a satisfactory sausage analog has been produced at various moisture levels, but a juicy-type product is not duplicated with gelation conditions only. This fact is true, regardless of moisture content or fat content in an attempt to duplicate a high quality juicy sausage. Thus, in the case of a frankfurter-type product, the consumer appears to prefer a juicy sausage compared to a sausage that has dryer characteristics. In a juicy frankfurter, a ready water release is a necessity when the product is bitten. With the use of rendered animal fats and/or vegetable oils, the moisture content of the analog seems to be tied into the composition and does not give this ready water release. The use of the vegetable protein, particularly an oilseed protein as soy, appears to act as an emulsifier and ties the fat or oil into the composition. This apparent effect of binding the fat and/or oil with water into the system prevents a ready release of the moisture content in the analog.

It has been unexpectedly discovered that if the sausage analog is subjected to a freezing operation to completely solidify and freeze the analog that upon subsequent thawing, juiciness qualities are introduced. The distinction between unfrozen and frozen-thawed analogs, of identical composition is remarkable. Additionally, the degree of juiciness is increased by lowering the temperature downward from the freezing point of water, as well as by the time of freezing. Increased results are obtained with lower freezing temperatures and/or increasing the duration of freezing.

The reason the freeze-thaw cycle aids in increasing juiciness is not entirely understood. It is theorized although not with complete certainty that the freezing cycle ties components such as the water and possibly the fat into distinct crystals which upon subsequent thawing remain as distinct pockets. Thus, this reasoning would account why the solids content of the product no longer appears to have the liquid content tied into its matrix. With pockets of the liquid which would be minute and spread substantially uniformly throughout the mixture, a ready release of liquid would occur when the sausage analog is bitten and eaten. However, this theory of crystallization and separation of liquid components does not provide answers as to why some increase in juiciness is realized as a freezing temperature is decreased below the freezing point of water. Additionally, this theory does not adequately explain why juiciness increases with time of freezing as for example, a 3-day freezing duration as compared to a 6-day freezing duration. Nevertheless, it has been discovered, regardless of the theory involved, that freezing of the analog with subsequent thawing of the product unexpectedly results in substantial increase in liquid release of the product and increase in juiciness. In fact, the freeze-thaw cycle of the sausage analog not only leads to increased juiciness over a product of similar composition without freeze-thaw, but also adds increased juiciness over sausage analogs that have increased water content as well as oil/fat constituents but no freeze-thaw cycle.

In the product of the sausage analog, the water content of the product is preferably between about 42 and 74 percent. An optimum range would be between 52 and 62 percent. At very low moisture contents, there will be juiciness in the product after the freeze-thaw cycle but due to the low water content, the analog will more closely resemble a dry-type sausage. At a high moisture content a very ready moisture release will be produced upon freeze-thaw and the product may be considered to be extremely moist.

An additional component in addition to the gel is an animal fat or vegetable oil. The animal fat is produced by conventional techniques or so called rendering. The vegetable oil content may be of any convenient class of oils well known in the art, including both hydrogenated and unhydrogenated types. The concentrations of these materials preferably range from about 5 to 30 percent with an optimum range of 15 to 20 percent.

To complete a balanced sausage analog, various additives may be incorporated to complete the flavor, chewiness and textural qualities of the gel process to be a meat analog. Flavorings, spices and coloring materials are necessary in most instances in duplicating the sausage product. Fillers have been found to give textural qualities to the analog as for example, "bound qualities" in biting in the case of a frankfurter-type analog. A suitable filler may be produced in accordance with McAllister, Finnucane, U.S. Pat. No. 3,102,031, patented Aug. 27, 1963, which is directed to a "high protein food granule". An additional example of a suitable filler is an expanded vegetable protein concentrate produced by extrusion at elevated temperature and pressure wherein a sudden release of pressure is employed to expand the material.

To further illustrate the innovating aspects of this invention, the following example is provided:

EXAMPLE 1

To form a product that resembles a frankfurter, the following constituents were used:

| | |
|---|---|
| Soy Protein Isolate (30% Solids) | 42.8 |
| Albumen | 1.0 |
| Wheat gluten/soy grits/flour mixture (Expanded filler with ammonium bicarbonate - 30% solids) | 20.8 |
| Crisco Oil | 18.8 |
| Water | 13.9 |
| Seasoning/Flavor/Color | 2.7 |

The wheat gluten-soy grits-flour mixture is an expanded high source protein in form of particles and is used as a filler material. This expanded mixture is formed by mixing wheat gluten, soy grits and flour with water to make a solids concentration of about 25 percent. Ammonium bicarbonate at a concentration of about 0.6 percent is employed since this material increases the expansion effect during processing. The residual ammonium bicarbonate concentration will approach 0 percent. The mix is fed into an inlet of a heated Model X-25 Wenger Extruder wherein the mix is subjected to elevated temperature and pressure by a revolving screw in the extruder. This mix is extruded through two ⅜ inch diameter dies with a recorded pressure of approximately 150 psig. and a temperature of approximately 300°F. at the die face to form a wet expanded product. The expanded product is ground before addition to the other constituents employed in this example.

The materials of this example are emulsified in a Hobart Cutter for a 10-minute period. Any large particles in the mix are further comminuted in a Puc Mill following the emulsification step. The emulsion is subjected to a seven-inch vacuum for one minute. The emulsion is stuffed in a casing employing conventional equipment used in formulation of frankfurters. The process is autoclaved at a pressure of 7 to 9 psig. for 45 minutes.

The frankfurter analogs produced by this process were subjected to various temperature conditions under normal non-frozen refrigeration, as well as under freezing temperatures of 18°F. to illustrate the difference in effect from the lower temperature. The frankfurter analogs stored under conventional refrigeration conditions without freezing were considered to be the control. At the end of 3 days a portion of the frozen analogs were thawed and compared to the refrigerated non-frozen analogs. With the control and the thawed analogs warmed to the same temperature, the thawed sample was visually observed to give a more readily release of water when subjected to physical pressure. Additionally when consumed, the thawed product had a more pronounced juicy effect than the control. Additionally, it was observed that thawed samples frozen for a period of 6 days had juicier qualities than thawed analogs frozen for a period of 3 days.

To illustrate the effect of temperature on the juiciness qualities of the analog, the source ingredients and the processing steps employed previously were duplicated. The analog after autoclaving was divided into 3 groups and stored respectively at 35°F.; 0°F. and −35°F. After an 18 day storage time, the analog samples stored at 0°F. and −35°F. were considerably more moist and juicy than the unfrozen control. Additionally, the samples stored at −35°F. were more moist and juicy than the samples frozen at 0°F.

What is claimed is:

1. In the process for preparing a food product which simulates in appearance, taste and texture meat products prepared from meat emulsions wherein a uniform mixture of;

1. a gel precursor consisting of a non-fibrous vegetable protein and a material selected from the group consisting of albumen, casein, whey and mixtures thereof, said vegetable protein being present above about 30 percent by weight of the gel precursor and wherein the minimum weight ratio of the vegetable protein to albumen, casein or whey is in the range of about 3.4:1, 5:3, and 1:1 respectively or a weighted total for mixtures thereof and wherein the maximum weight ratio of vegetable protein to albumen, casein, whey or combinations thereof is about 40:1,
   2. a material selected from the group consisting of rendered animal fat, vegetable oil, and combinations thereof in an amount ranging from about 5 to about 30 percent by weight of the mixture,
   3. a filler material in the form of particles of an expanded high protein source mixture of wheat gluten, soya grits and flour in an amount of about 6 percent by weight of the mixture,
   4. small, but effective amounts of flavorings, spices and coloring components sufficient to impart to the mixture the flavor and coloring associated with meat products prepared from meat emulsions, and
   5. water in an amount ranging from about 42 percent to about 74 percent by weight of the mixture, is shaped to a desirable form and heat-set, the improvement which comprises;

a. freezing the shaped heat-set mixture at a temperature below 32°F.,
   b. holding the frozen shaped mixture at a temperature below 32°F. for a period of time in excess of three days, and
   c. thawing the frozen shaped mixture, whereby a pronounced juicy effect is imparted to the food product when consumed.

2. The process according to claim 1 wherein the shaped, heat-set mixture is held at a temperature of minus 35°F. for a period of time in excess of 18 days prior to being thawed.

* * * * *